United States Patent
Kramer

(10) Patent No.: US 9,671,518 B2
(45) Date of Patent: Jun. 6, 2017

(54) MULTIPLE SOURCE NEUTRON MEASUREMENT, DEVICE, SYSTEM AND USE THEREOF

(71) Applicant: Roke Technologies Ltd., Calgary (CA)

(72) Inventor: Hermann Kramer, Calgary (CA)

(73) Assignee: Roke Technologies Ltd., Calgary, Alberta (CA)

( * ) Notice: Subject to any disclaimer, the term of this patent is extended or adjusted under 35 U.S.C. 154(b) by 0 days.

(21) Appl. No.: 14/769,292

(22) PCT Filed: Feb. 18, 2014

(86) PCT No.: PCT/CA2014/000117
§ 371 (c)(1),
(2) Date: Aug. 20, 2015

(87) PCT Pub. No.: WO2014/127452
PCT Pub. Date: Aug. 28, 2014

(65) Prior Publication Data
US 2015/0378049 A1    Dec. 31, 2015

Related U.S. Application Data

(60) Provisional application No. 61/766,823, filed on Feb. 20, 2013, provisional application No. 61/766,825, filed on Feb. 20, 2013, provisional application No. 61/766,826, filed on Feb. 20, 2013.

(51) Int. Cl.
*G01V 5/10* (2006.01)
*E21B 47/026* (2006.01)
*G01V 5/04* (2006.01)
*E21B 47/02* (2006.01)
*E21B 7/04* (2006.01)

(52) U.S. Cl.
CPC .................. *G01V 5/10* (2013.01); *E21B 7/04* (2013.01); *E21B 47/02* (2013.01); *E21B 47/026* (2013.01); *G01V 5/045* (2013.01); *G01V 5/104* (2013.01)

(58) Field of Classification Search
CPC ............. G01V 5/10; G01V 5/104; G01V 5/14
See application file for complete search history.

(56) References Cited

U.S. PATENT DOCUMENTS

| 3,567,935 A | 3/1971 | Nagel | |
| 3,887,805 A * | 6/1975 | Schuster | G01V 5/14 250/264 |
| 3,942,004 A * | 3/1976 | Kehler | G01V 5/14 250/266 |
| 8,558,165 B2 * | 10/2013 | Evans | G01V 5/10 250/269.2 |
| 2012/0019510 A1 * | 1/2012 | Bingham | G01V 5/0008 345/419 |

FOREIGN PATENT DOCUMENTS

GB        2265980 A        10/1993

* cited by examiner

*Primary Examiner* — Casey Bryant
(74) *Attorney, Agent, or Firm* — Dilworth & Barrese, LLP

(57) ABSTRACT

A multi-source neutron logging tool has been developed. The multi-source logging tool comprises axially aligned gamma and thermal neutron detectors on either side of a multi-neutron source. The multi-source neutron logging tool may be used to evaluate formations adjacent a borehole.

6 Claims, 13 Drawing Sheets

MULTIPLE SOURCE NEUTRON MEASUREMENT, DEVICE, SYSTEM AND USE THEREOF

FIELD OF THE INVENTION

In certain embodiments, the invention relates to multiple neutron source geophysical measurement devices and more specifically to multiple neutron source emission and geometry characterization and use and manipulation thereof for use in, for example, formation characterization.

BACKGROUND

Borehole measurement devices may be used to determine formation characteristics surrounding the borehole and are typically used in wellbores drilled for the purpose of extracting natural resources, such as hydrocarbon, from the formations surrounding the borehole. Borehole measurement devices or logging tools may use different types of measurements, for example, a borehole measurement device may use gamma measurements, thermal neutron measurements, resistivity measurements or other types of measurements.

At present there are a number of physics being employed to perform thru pipe formation evaluation and other wellbore measurements. For neutron based measurements, there are pulsed neutron thermal neutron, pulsed neutron gamma, gamma gamma, neutron thermal neutron, neutron epi-thermal neutron etc. It is noted that naming convention for down hole geophysical devices are based on source—detection physics. For example neutron thermal neutron indicates a neutron source and thermal neutron detection. Most of these systems utilize one source per physics, which will be referred to as single physics measurement. Systems that utilize one source for two physics will be referred to as a dual physics measurement. Of the currently available dual physics systems, there is one that utilizes a combination neutron thermal neutron, neutron epi-thermal neutron which can be considered the closest analogy to the Quad Neutron dual physics measurement. In addition there is a neutron thermal neutron, neutron gamma dual physics measurement device built in Azerbaijan.

The Some shortcomings or disadvantages of using single physics measurements is the lack of corrections available for factors such as borehole rugosity, annular fluid changes, mineralogy, tubulars etc. To compensate for these short comings, dual detectors are used. These devices are commonly referred to as compensated devices. Another solution is to combine multiple single physics measurement devices, including compensated devices, during analysis. An example is neutron thermal neutron and gamma gamma physics, commonly referred to as neutron density measurements. Measuring thru pipe also limits the effectiveness of some of the physics. For example, gamma gamma measurements are limited because the pipe itself shields gamma and therefore there are losses as the gamma photons travel from the source thru the pipe and then again as the photon returns back to the detector. This results in low count rates and increases error in the measurements.

Neutrons can easily penetrate pipe and therefore is a logical choice for thru pipe measurements. Of the neutron physics based measurements; pulsed neutron devices do not lend themselves to dual physics measurements. The reason is that the length of the pulsed neutron source does not allow for effective measurement spacing for the required detectors. Chemical neutron sources are much smaller and therefore can be used effectively for dual physics based measurements. The neutron epi-thermal measurement is highly sensitive to borehole rugosity and therefore not an ideal choice to determine formation parameters. The measurement industry typically uses a single neutron source measure device to collect this data. A single neutron source device is used to achieve high neutron output. A single high neutron source is used with a generally assumed spheroid geometry for the source field with the center being the source of the neutrons. Device detectors are placed near the source as to be within the field. Typically, devices are designed to have one detector as near to the source as practically possible in an axial configuration. Generally, limitations as to proximity are mechanical in nature. However, the use of a single high output neutron source has limited accuracy with respect to the data collected relating to porosity and clay volume measurements.

Early commercial neutron logging tools comprised a single neutron source and a single neutron detector. The information derived by these tools was of rather limited value, since it did not separate the effects of formation porosity and formation salinity.

Several approaches were taken to eliminate or at least to reduce the borehole effect on the porosity reading of a neutron well logging tool. One simple way to achieve this is to design a decentralized tool with the source and detectors pressed against one wall of the borehole.

A dual neutron emission measure device has also been developed which alternates the source outputs. However, this results in a spheroid field geometry. In addition, the alternating source does not enhance the source field geometry and does not allow for an effective balanced 4 detector measurement system.

A need therefore exists for a neutron source geophysical measurement device that overcomes one or more of the shortcomings observed in the industry.

SUMMARY OF INVENTION

In one embodiment, the invention provides for a multi-neutron source downhole logging tool for collecting data useful in evaluating a characteristic of a formation adjacent a wellbore, the logging tool comprising:
- a multi-neutron source, each neutron source axially aligned for simultaneous emission of a neutron field into the formation;
- a short detector for detecting a neutron gamma field and a neutron thermal neutron field; and
- a long detector for detecting a neutron gamma field and a neutron thermal neutron field.

In a further embodiment of the logging tool above the neutron sources of the multi-neutron source are sequentially aligned end-to-end for simultaneous emission of a neutron field into the formation.

In a further embodiment of the logging tool above the neutron sources of the multi-neutron source are arranged to provide a preferential neutron interference field when simultaneous fields are emitted from the sources.

In a further embodiment of the logging tool above the short detector and the long detector are situated at an optimal distance from the multi-neutron source so that the error associated with the short detector substantially cancels the error associated with the long detector.

In a further embodiment of the logging tool above the multi-neutron source is a dual-neutron source.

In a further embodiment of the logging tool above the logging tool further comprises a housing comprising beryllium copper.

In another embodiment, the invention provides for a method of evaluating a characteristic of a formation adjacent a wellbore comprising:
  simultaneously emitting neutron fields into the formation from at least two axially aligned neutron sources;
  obtaining data comprising a long neutron neutron (LNN), short neutron neutron (SNN), long neutron gamma (LNG) and short neutron gamma data (SNG) from the neutron fields emitted into the formation;
  combining the long data with the short data to reduce error associated with the characteristic to be evaluated.

In a further embodiment of the method above, the method further comprises the step of:
  optimizing a spacing of long detectors for detecting LNN and LNG relative to the multi-neutron source and short detectors for detecting SNN and SNG relative to the multi-neutron source to minimize the error associated to the characteristic to be evaluated.

In a further embodiment of the method above, the step of simultaneously emitting neutron fields into the formation is through a wellbore casing.

In a further embodiment of the method above, the combining step comprises the cancelation of the error associated to the long data with the error associated to the short data.

In a further embodiment of the method above, the characteristic is neutron porosity (QTP) and is evaluated according to:

$$QTP = A * \ln\left(\frac{SNN * LNG}{SNG * LNN}\right) + B$$

wherein A and B are determined empirically and are influenced by bit size and the amount of high dense material in a volume of investigation.

In a further embodiment of the method above, the characteristic is neutron clay (QNC) and is evaluated according to:

$$QNC = A * \left(C^{\left(\frac{SNG}{LNG}\right)} + D * \left(\frac{SNN}{LNN}\right)\right) + B$$

wherein A, B, C and D are empirically determined coefficients.

In a further embodiment of the method above, A, B, C and D are 0.004, 0, 1.9 and −1.5, respectively.

In a further embodiment of the method above, the characteristic is neutron liquid (QNL) and is evaluated according to:

$$QNL = A * \ln\left(\frac{LNG * SNG}{LNN * SNN}\right) + B$$

wherein A and B are chosen to create the best overlay of QNL to QTP.

In a further embodiment of the method above, the characteristic is water saturation (Sw) and is evaluated according to:

$$Sw = 1 - kf\frac{(QEP - QEL)}{QEP}$$

wherein
  k=fluid factor;
  f=formation factor;
  QEP=Quad Effective Porosity (Clay Free); and
  QEL=Quad Effective Liquid porosity (Clay Free); and
wherein
  QEP and QEL are determined as follows:

QEP=QTP−QC and QEL=QL−QC wherein
  QTP=Quad Total Porosity;
  QC=Quad Clay Porosity; and
  QL=Quad Liquid Porosity;
  the fluid factor k=1/(MaxPor*QLgain)
wherein
  MaxPor=WaterPor−OilPor;
  WaterPor is determined as follows:

WaterPor=(12.73+$\sqrt{12.73^2-4*0.0966*(403.04-\text{Water}kppm)}$)/(2*0.0966)

OilPor is determined as follows:

OilPor=0.1333*oilAPI+71 and

QLgain is computed as

QLgain=QNL A value/32.5.

In another embodiment, the invention provides a method of determining the relative bulk density of a formation adjacent a wellbore through the wellbore casing comprising:
  simultaneously emitting neutron fields into the formation from at least two axially aligned neutron sources;
  obtaining long neutron neutron (LNN) field readings and long neutron gamma (LNG) field readings;
  converting the LNN and LNG for porosity to provide LNNpor and LNGpor respectively; and
  determining the relative bulk density by subtracting the LNGpor from LNNpor,
  wherein LNNpor and LNGpor represent the porosity converted counts.

In another embodiment, the invention provides a method of determining the nuclear caliper of a formation adjacent a wellbore through the wellbore casing comprising:
  simultaneously emitting a neutron field into the formation from at least two axially aligned neutron sources;
  obtaining long neutron neutron (LNN) field readings and short neutron neutron (SNN) field readings;
  converting the LNN and SNN for porosity to provide LNNpor and SNNpor respectively; and
  determining the nuclear caliper by subtracting the LNNpor from SNNpor,
  wherein SNNpor and LNNpor represent the porosity converted counts.

In another embodiment, the invention provides a method of determining the chemical effect of a formation adjacent a wellbore through the wellbore casing comprising:
  simultaneously emitting a neutron field into the formation from at least two axially aligned neutron sources;
  obtaining long neutron gamma (LNG) field readings and short neutron neutron (SNN) field readings;
  converting the LNG and SNN for porosity to provide LNNpor and LNGpor respectively; and
  determining the chemical effect by subtracting the LNGpor from SNNpor, wherein SNNpor and LNGpor represent the porosity converted single detector counts.

In another embodiment, the invention provides a system for evaluating a characteristic of a formation adjacent a wellbore comprising:

a logging tool for downhole use collecting data for evaluating a characteristic of a formation adjacent a wellbore, the logging tool comprising:
 a multi-neutron source, each neutron source axially aligned for simultaneous emission of a respective neutron field into the formation;
 short detectors for detecting a neutron gamma field and a neutron thermal neutron field; and
 long detectors for detecting a neutron gamma field and a neutron thermal neutron field; and
a computer for combining the long data with the short data to reduce error associated to the characteristic to be evaluated.

BRIEF DESCRIPTION OF THE DRAWINGS

Embodiments are described herein with references to the appended drawings, in which.

DETAILED DESCRIPTION

A multi-source neutron geophysical measurement device or logging tool has been developed. The multi-source logging tool comprises axially aligned gamma and thermal neutron detectors on either side of a multi-neutron source. One embodiment of the logging tool utilizes two axially aligned neutron sources placed sequentially, end to end and will be described in further detail with reference to FIGS. 1-4 below. It has been determined that the two neutron sources may be used to achieve a preferential neutron interference field when simultaneous fields are emitted from the sources. The angle of the interference field can be adjusted to provide a preferential neutron activity focal point closer to the detector than a conventional single neutron source. The device along with the mathematics have provided accurate porosity and clay volume measurements in both open hole and thru pipe measurement environments. Experiments performed, surprisingly, uncovered a key component to the device measurement success, the dual neutron source.

Figure 1:
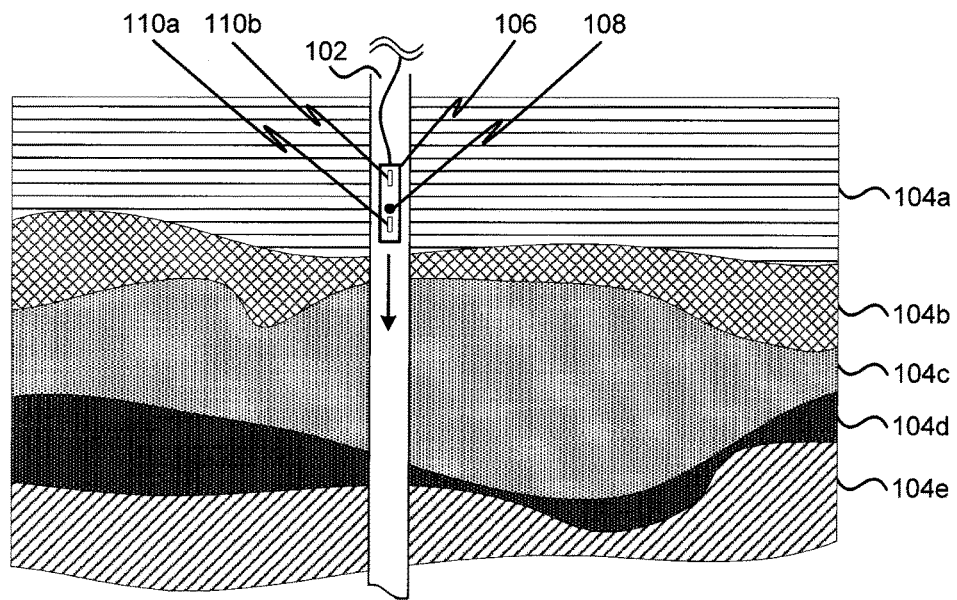
FIG. 1 is a diagram of a single source neutron logging tool for carrying out neutron detection in a wellbore, optionally thru a casing, of formation characteristics adjacent or nearly adjacent the wellbore.

The use of a borehole logging tool or measurement device in determining formation characteristics of an existing vertical borehole is shown for illustrative purpose in FIG. 1. As depicted, a borehole 102 is drilled through a plurality of formations 104a, 104b, 104c, 104d, 104e. A logging tool 106 or measurement device may be lowered down the borehole to determine one or more characteristics within the formation(s). The logging tool 106 may include, for example, a multi- or dual-neutron source 108 and a plurality of neutron detectors including short neutron detectors 110a and long neutron detectors 110b, such as gamma detectors, thermal neutron detectors, or epithermal neutron detectors. The positioning of the neutron detectors will be discussed in further detail below and with reference to FIGS. 3 and 4. The measurement characteristics may be associated with the height of the measurement within the borehole. Measurements in vertical, horizontal or deviated boreholes may be made after the borehole is drilled or as it is being drilled and may also be made after installation of the casing.

The neutron analysis technology using four different types of data set collection including two data sets for neutron thermal neutron field detectors (one closer to the neutron source referred to as the short neutron thermal neutron field or data set and one further from the neutron source referred to as the long neutron thermal neutron field or data set) and two data sets from neutron gamma field detectors (one closer to the neutron source referred to as the short neutron gamma field or data set and one further from the neutron source referred to as the long neutron gamma field or data set) is referred to herein is as quad neutron technology as the neutron analysis technology includes four types of data set and the logging tool which both emits and detects the neutron field includes, in this case a single neutron source, and two sets of two detectors, namely short thermal neutron and gamma detectors and long thermal neutron and gamma detectors. An illustrative embodiment of a quad multi- or dual-neutron source logging tool and drilling system will be discussed in more detail below with reference to FIGS. 1, 2, 3 and 4-9.

A multi- or dual-neutron source with multiple detectors can provide useful information on formation characteristics. As described further herein, it is possible to obtain formation characteristics from neutron field measurements acquired by neutron detectors including thermal neutron detectors and gamma detectors positioned in the logging tool at short and long distances from the neutron sources.

It will be appreciated that in practice, the neutron sources are inserted in-line with each other, similar to batteries in a flashlight. The detectors are also in-line and therefore the detectors are not spaced the same distance from each source.

The detectors are physically a similar distance from the sources but, it will be appreciated that this is not necessary.

Figure 2:
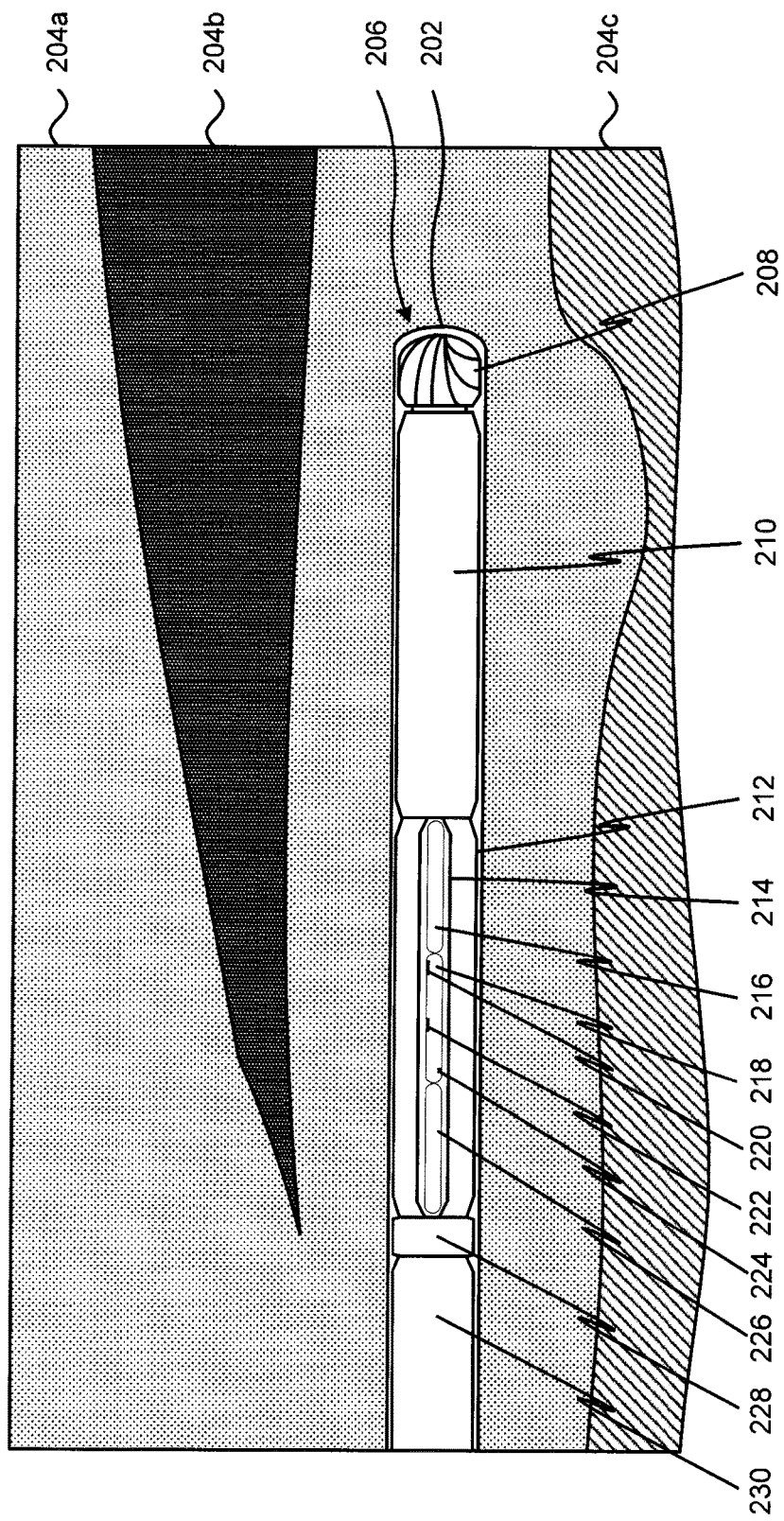
FIG. 2 is a diagram of a drilling system for taking neutron measurements using a single neutron source.

FIG. 2 is a diagram of a drilling system for taking formation measurements using a multi- or dual-neutron source logging tool. As depicted, a borehole 202 is drilled through the ground, which may comprise numerous different formations 204a, 204b, 204c (referred to collectively as formations 204). As will be appreciated, different formations will have different characteristics such as porosity, density, clay levels, oil saturation, water saturation and other characteristics. The borehole 202 is formed by a drilling system 206.

The drilling system 206 comprises a number of components for drilling the borehole 202 as well as measuring and logging data of the borehole 202 and surrounding formations 204. As will be appreciated, the drilling system 206 is representative of a typical drilling system and numerous specific drilling systems are possible, with their particular suitability to particular applications known to one skilled in the art. The drilling system 206 comprises a drilling string in the borehole. The drilling string has at its head a drill bit 208 and a mud motor 210. Drilling mud is supplied to the mud motor 210 from the surface under pressure. The drilling mud causes the mud motor 210 to rotate the drill bit 208. It is noted that when using a mud motor as depicted, up-string components, that is components of the drilling string connected between the mud motor 210 and the surface do not rotate with the drill bit 208.

One or more pipes 212 may be included in the drill string. The pipe 212 is depicted as having a number of sensor devices 216, 218, 226 within its interior 214. As will be appreciated, numerous different sensor devices can be incorporated into the drill string at various different locations. The sensor devices 216, 218, 226 are depicted as being housed within the same pipe 212 for convenience. The different sensor devices may provide various functionality. For example, sensor device 216 may provide telemetry measurements, inclination measurements, magnetic field strength measurements, pressure measurements, vibration measurements, or other types of measurements as desired or appropriate as would be appreciated.

The sensor device 218 also provides measurements, however as described further below, it provides neutron-based measurements. These measurements can provide an indication of formation characteristics surrounding the borehole. The formation characteristics that can be determined from the measurements depend upon the analysis carried out following collection of the field information by the short and long sensors incorporated into the device, and may include measurements such as density, porosity, saturation, borehole caliper. The sensor device 218 is depicted as having a dual-neutron source 222 and a long neutron detector 220 and a short neutron detector 224. The short and long neutron detectors may comprise a gamma detector and a thermal neutron detector or epi-thermal neutron detector.

In one embodiment, the quad logging tool comprises both thermal neutron detectors on one side of the neutron source and the neutron gamma detectors on the other side. The layout shown in the Figures shows the short neutron on the opposite side of the source as compared to long neutron which is not intended to be limiting as, outlined above, the thermal neutron detectors may be on one side of the neutron source and the neutron gamma detectors on the other side.

The sensor devices 216, 218 may store the measurement information internally in memory for later retrieval and processing at the surface. Additionally or alternatively, the measurement information, or a portion of the measurement information, may be transmitted in real-time or near real-time to the surface using various communication techniques. For example, an additional device 226 may receive the measurement information from a plurality of sensor devices 216, 218 and provide storage of the measurements and/or communicate the measurements to the surface. For example, the additional device 226 can provide a wire line communication interface or other type of down-hole communication interface such as mud-pulse communication. Although the storage and/or communication of measurements by sensor devices 216, 218 have been described as being provided by an additional device 226, it is contemplated that the storage and/or communication interface may be provided in each individual device.

Figure 3:
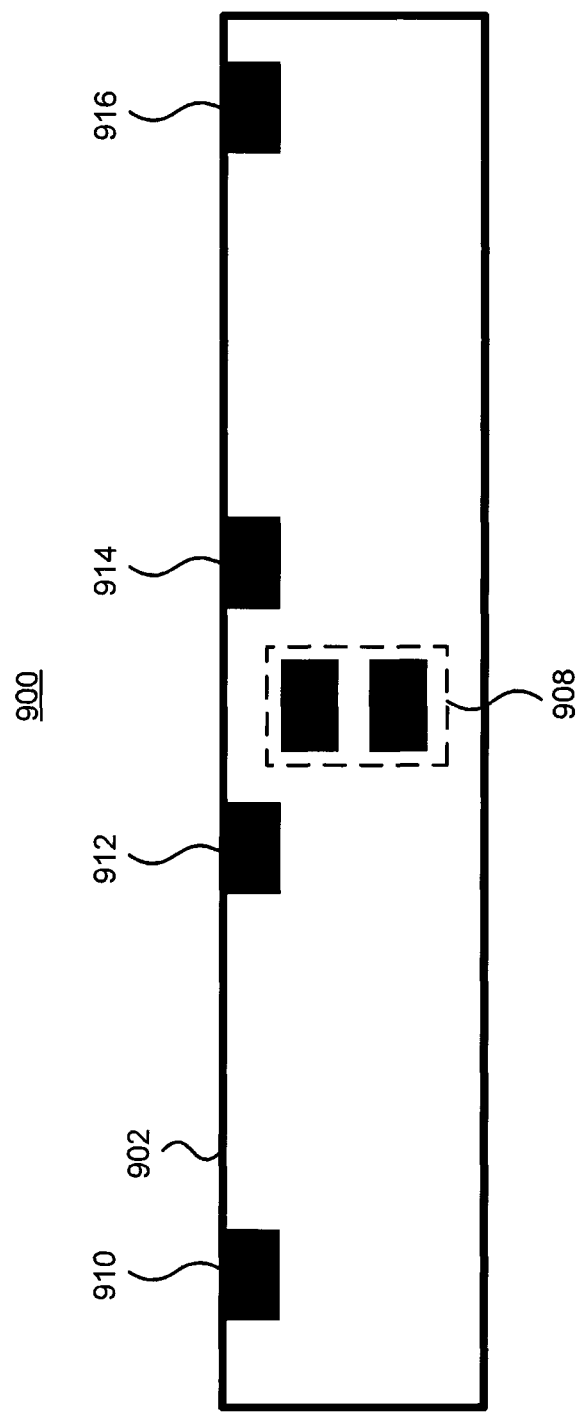
FIG. 3 is a diagram of an example of a single neutron source logging tool having both long and short detectors capable of taking measurements thru a wellbore casing.

FIG. 3 is a diagram of a logging tool capable of taking neutron field measurements using a dual-neutron source. The logging tool 900 may be incorporated into a drill string in order to provide measurements while drilling or alternatively may simply be put down the wellbore following drilling to provide a characterization of the formations adjacent the wellbore at various stages of operation or production. The logging tool 900 comprises a housing 902 or casing. The housing may be made from beryllium copper which has been determined to have very good gamma transmissivity properties while still retaining the required mechanical properties for down hole tool housings, such as for example resistance to pressure, temperature and corrosion.

The logging tool 900 further includes a dual-neutron source 908 for emitting a neutron field into the formation(s) adjacent the wellbore and neutron-based detectors 910, 912, 914, 916, such as gamma detectors, thermal neutron detectors and/or epi-thermal neutron detectors. The dual neutron source 908 utilizes two axially aligned neutron sources placed sequentially, end to end. The two neutron sources may be used to achieve a preferential neutron interference field when simultaneous fields are emitted from the sources. The angle of the interference field can be adjusted to provide a preferential neutron activity focal point closer to the detector than a conventional single neutron source. The neutron detectors 910, 912, 914, 916 are situated from the dual-neutron source 908 so that certain detectors are closer to the dual-neutron source, referred to as short detectors such as detectors 912 and 914 and certain detectors are further way from the dual-neutron source, referred to as long detectors such as detectors 910 and 916. As depicted, the dual-neutron source 908 and neutron-based detectors 910, 912, 914, 916 are arranged off-centre from the logging tools centre axis, however, any suitable orientation may be used so long as a short and long measurement may be made. Further discussion relating to the orientation of the short and long detectors will be outlined in more detail below.

FIG. 104 depicts a further logging tool capable of taking measurements for characterising a formation adjacent a wellbore using a dual-neutron source. The logging tool 1000 may be received within a drill pipe or a casing. The logging tool 1000 may be rotated with the drill pipe, which in turn is rotated by the drilling rig. Alternatively, an electric motor may be used to rotate the logging tool if power can be supplied to the logging tool from the surface. It will be appreciated that other techniques for rotating the logging tool may be employed.

Figure 4:
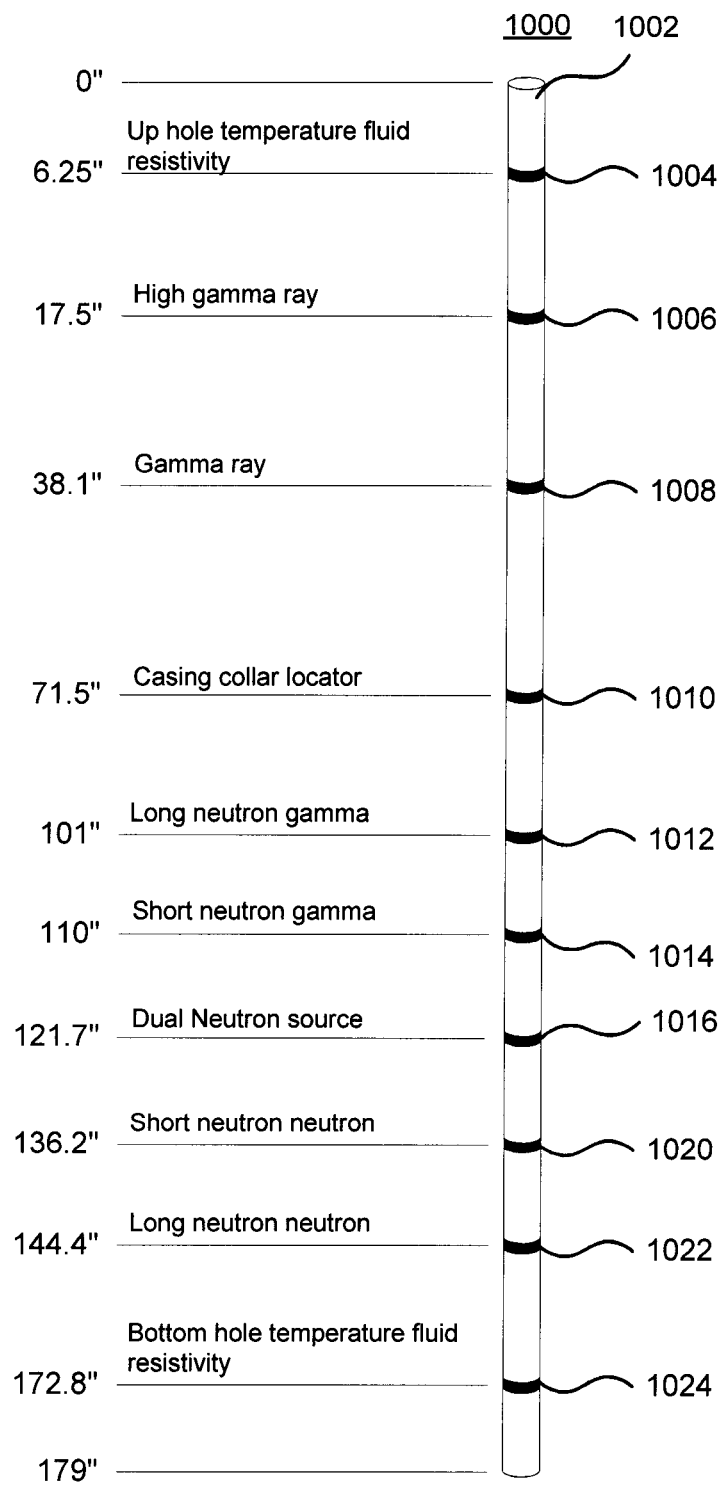
FIG. 4 depicts a further example of a single source logging tool having both long and short detectors capable of taking measurements thru a wellbore casing.

The logging tool 1000 may comprise a cylindrical housing 1002 for housing the various detectors and components of the tool. Although the particular dimensions may vary, the logging tool 1000 is depicted as having a length of 179 inches. The main cylindrical housing may have an outer diameter of approximately 1.7 inches and may be made from beryllium copper which has been determined to have very good gamma transmissivity properties while still retaining the required mechanical properties for down hole tool housings, such as for example resistance to pressure, temperature and corrosion. As depicted, the logging tool 1000 includes various sensors and detectors located along the length of the tool. An up-hole temperature sensor 1004, which may also measure fluid resistivity, may be located 6.25 inches from an up-hole end of the tool. A high gamma ray detector 1006 and a gamma ray detector 1008 may be located 17.5 inches and 38.1 inches from the up-hole end, respectively. A casing collar locater 1010 may be located at 71.5 inches from the up-hole end. Long and short neutron gamma detectors 1012, 1014 may be located 101 inches and 110 inches from the up hole end, respectively. A dual-neutron source 1016, such as an including Americium Beryllium source, may be located at 121.7 inches from the up-hole end. Short and long neutron neutron detectors 1020, 1022 may be located at 136.2 inches and 144.4 inches from the up-hold end, respectively. A bottom hole temperature and fluid resistivity sensor 1024 may be located 172.8 inches from the up-hole end of the logging tool. It should be appreciated that the logging tool depicted in FIG. 4 is intended to provide one illustrative arrangement of components. It is contemplated that various components can be omitted, their positions within the tool changed including the lengths from the up-hole end and other components included.

Figure 7:
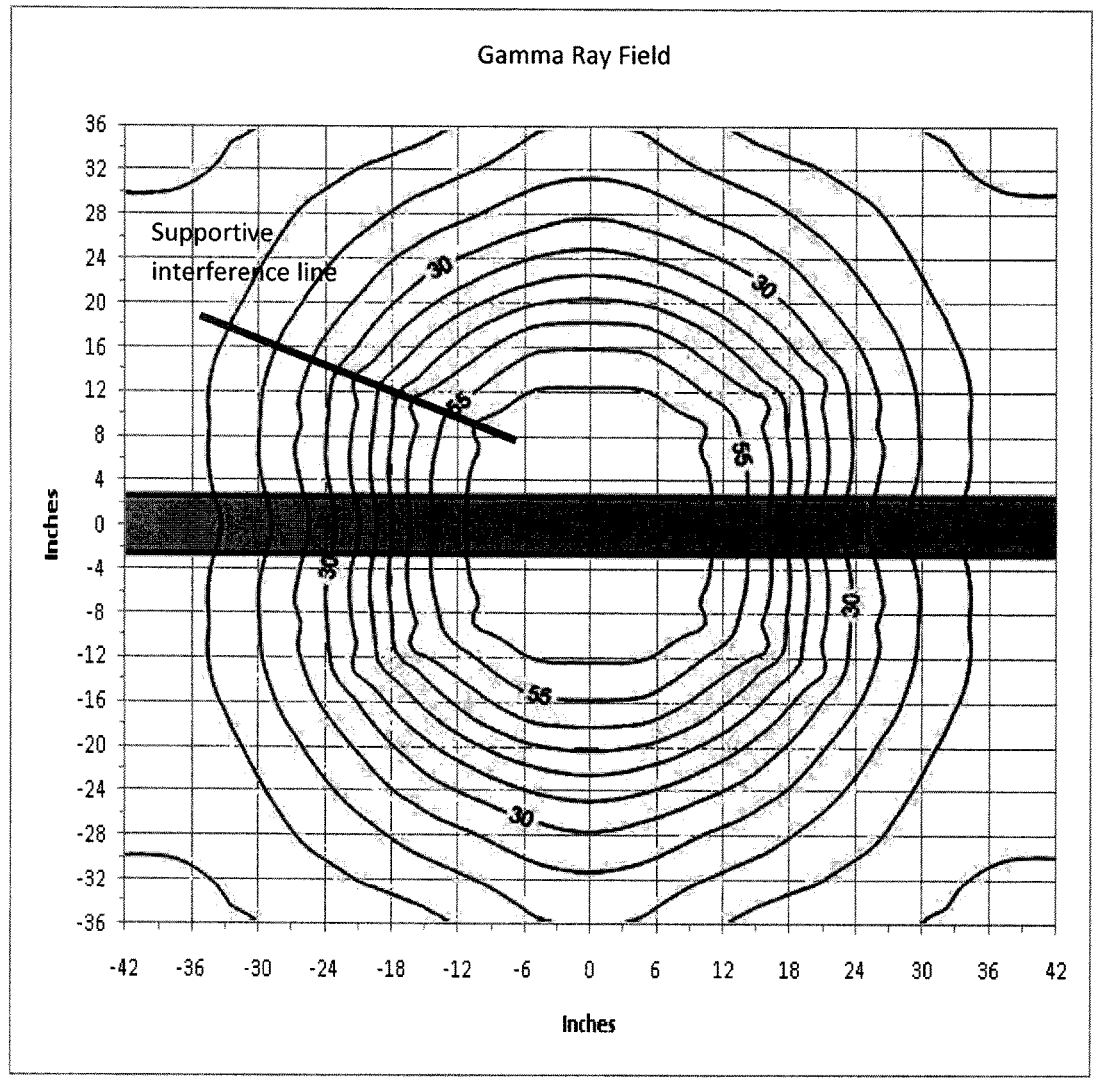
FIG. 7 is a diagram showing gamma field measurements taken wherein two neutron sources axially centered inside a tank with source activity spaced approximately 2" apart with a line indicating the supporting interference.

Until recently, it was assumed that the dual neutron emission field geometry is two spheroids intersecting each other and that this was the extent of the geometry. Experiments performed to confirm the field geometry uncovered a preferential field increase where the two spheroid fields intersected in such a manner as to increase the field intensity. A plot of the gamma field within the test chamber is shown in FIG. 7. A line highlights the increased intensity trend.

Without wishing to be bound by theory, it is believed that the increased intensity trend is perpetuated by the neutron interactions. Neutron interactions can be based on particle physics. The common analogy is a billiard ball effect. The neutron travels through space colliding with other particles. When the neutron collides with an atom having a nucleus much larger than itself, it deflects off the larger nucleus causing very little change in direction for the larger nucleus. When the neutron collides with a hydrogen atom that has almost the same mass as the neutron, an efficient energy exchange occurs and depending on incident angle, both the hydrogen atom and the neutron can move in altered directions. If a neutron collides with a neutron a much more efficient energy exchange occurs. It is believed that the probability of this event increases when using the dual neutron sources. The trend line is a connections of the points where the probability of supportive (additive) interaction occurs.

Figure 5:
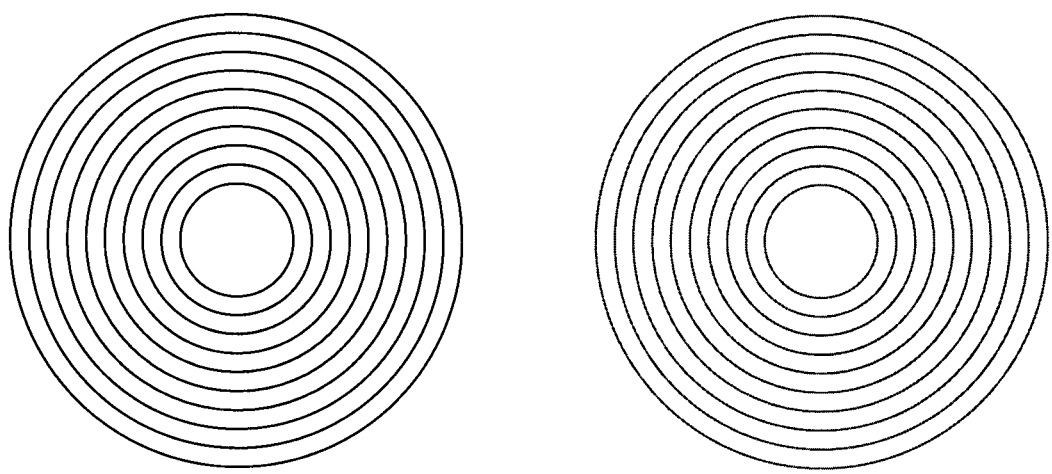
FIG. 5 is an illustrative diagram of two individual neutron source fields.

A simple theoretical example illustrates the additive function of the field interactions. Using concentric circles that represent the field strength of a single neutron source cut on a plane through the center of the field spheroid, a field interactions can be illustrated and is shown in FIG. 5.

Figure 6:
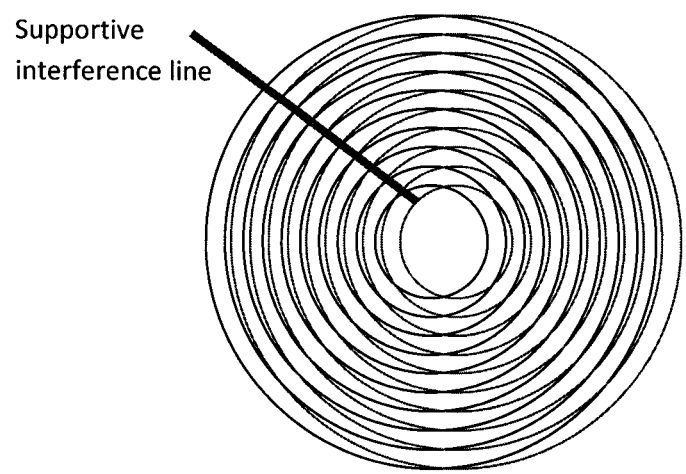
FIG. 6 is an illustrative diagram of two overlapping neutron source fields wherein the interference of the overlapping neutron source fields is shown with a line indicating the supporting interference.

If the individual sources are put together, the fields will cross creating an interference pattern as shown in FIG. 6.

One benefit for the dual-neutron source geophysical measurement device include focusing neutron flux. This can be used to create a higher region of influence that is closer to the sensor detectors reducing the distance from detector to source spacing.

Applications include using different source strengths to preferentially focus one side of the combined sources.

It has been confirmation that a small 2×3 curie source combination provides excellent comparison to geophysical core data and, without wishing to be bound by theory the fact that they provide the interference pattern is believed to be the reason behind it. In theory, controlling the geometry can create advantages in the measurement for different applications.

Experimental Data

Figure 9:
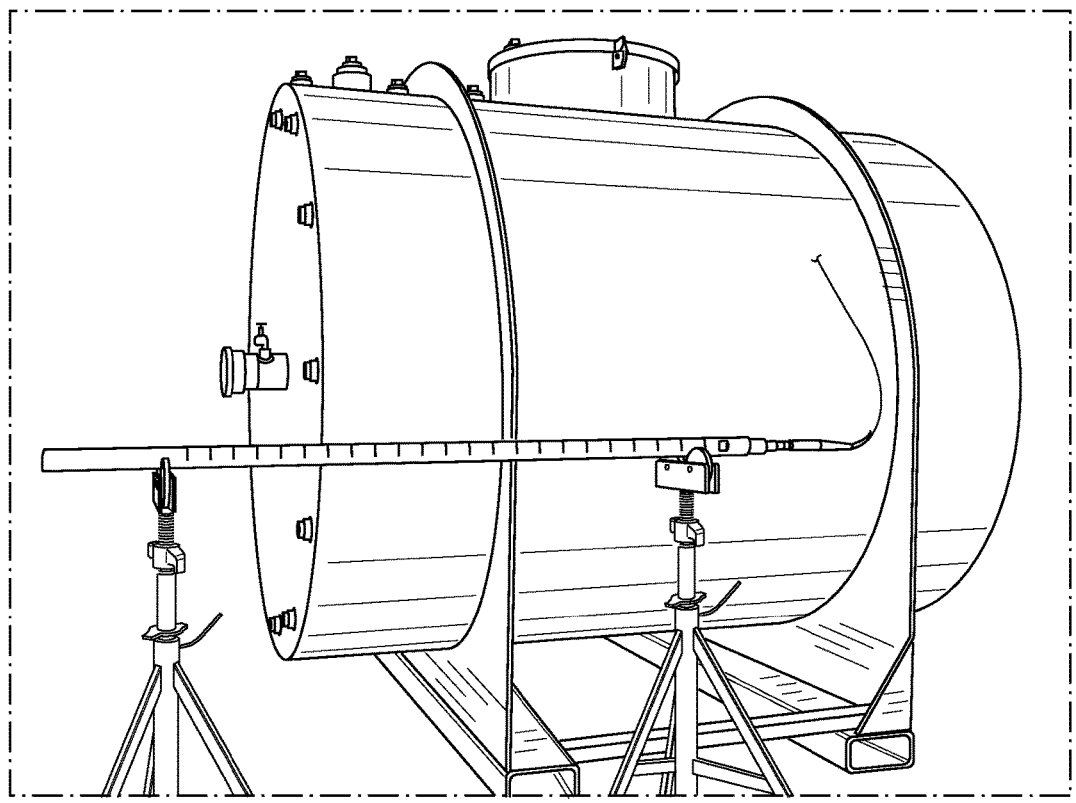
FIG. 9 is an image of a dual-neutron emission device used to carry out some of the experimental data collection.

Measurements done in a controlled environment confirm the same supportive interference. An experiment was done in a barrel 6 ft in diameter and 7 ft long. A length of 4½" OD pipe was installed through the center of the barrel. The pipe protrudes approximately 12" past each end of the barrel. Each end of the pipe is threaded and each end has a ½" port attached to the top side. Modified pressure unions are attached to each threaded end to allow fluids to be introduced inside the pipe with the device containing the neutron sources. The entire tank is filled with potable water with a salinity 300 ppm±50%. Ports at the top of the tank allow neutron measurement and neutron gamma measurement devices to be inserted to measure the field responses. The barrel used for the experiment is shown in FIG. 9.

Field measurements were done with two neutron sources axially centered inside the tank with source activity spaced approximately 2" apart. The resulting gamma and neutron fields are shown in FIGS. 7 and 8, respectively.

Figure 8:
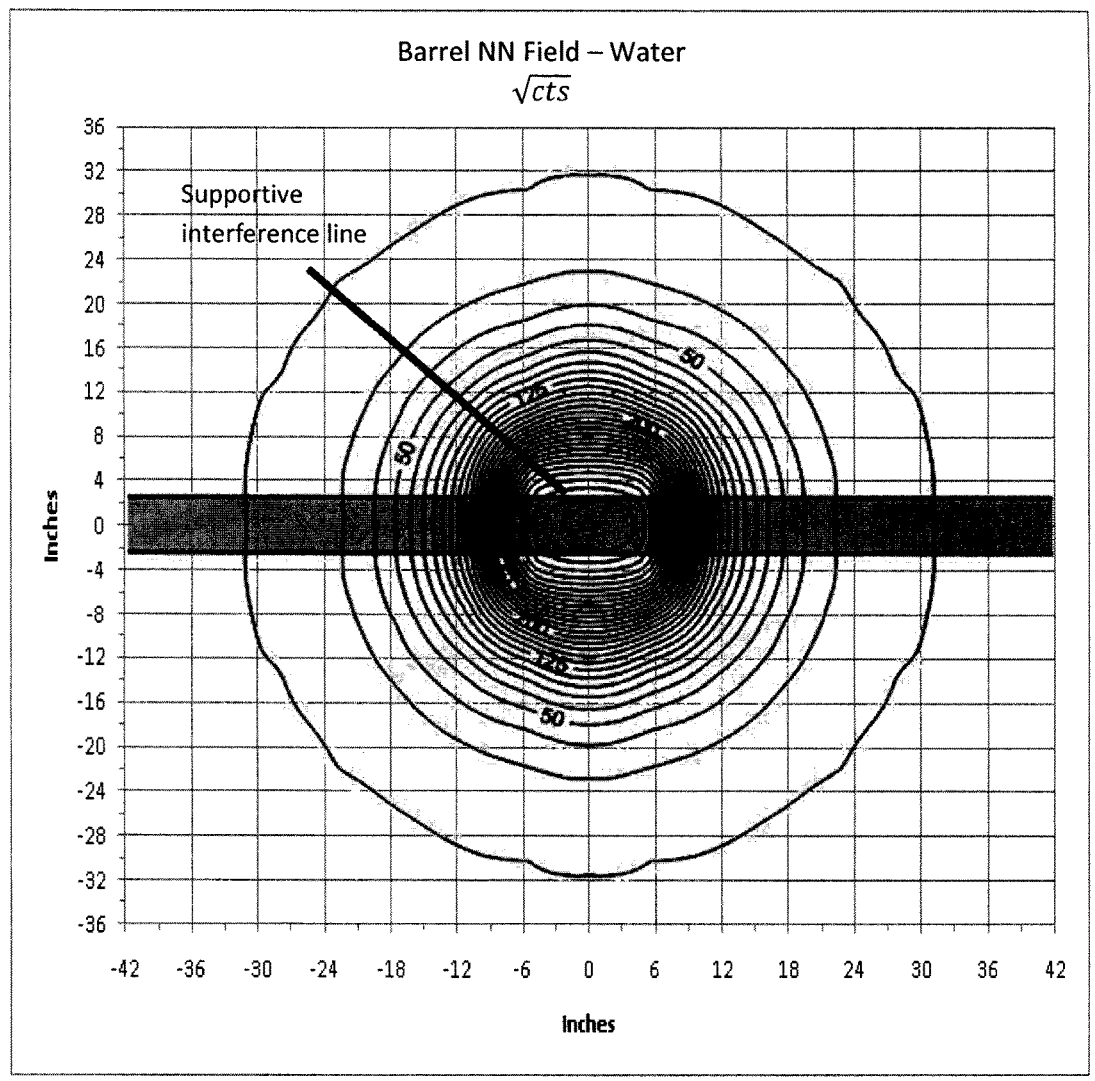
FIG. 8 is a diagram showing thermal neutron field plot taken wherein two neutron sources axially centered inside a tank with source activity spaced approximately 2" apart with a line indicating the supporting interference.

With reference to FIG. 8 and the thermal neutron field plot, the pipe is fresh water filled and the barrel is filled with fresh water. The units on the graph are the square root of the measured count rates.

One benefit for the dual neutron source geophysical measurement device include focusing neutron flux. This can be used to create a higher region of influence that is closer to the sensor detectors reducing the distance from detector to source spacing.

Applications include using different source strengths to preferentially focus one side of the combined sources.

As outlined in co-pending application (INSERT SERIAL NUMBER, Gowlings reference 08922995US titled "Neutron Through-Pipe Measurements" herein incorporated by reference, research was conducted to determine the properties for the neutron measurement model of the quad neutron logging tool. Observations during this research led to the conclusion that the nuclear properties for the quad neutron logging tool may be characterized with the physics of particles and fields. This realization led to the development of the Quad NN (Neutron Neutron) String model.

Without wishing to be bound by theory or limited in any way, the non-limiting quad NN string model may be explained as follows. In any matrix, a neutron has a maximum travel distance from the neutron source before it is captured. The travel length from the source to the furthest capture point is considered a straight line which can be replaced by a string with one point permanently fixed at the source and the other at the capture point. The string then represents the maximum distance a neutron can travel from the source within the matrix. If a neutron can travel the entire length of the straight string, in should then be able to travel half the distance and then back again to the source. This can be represented by fixing both ends of the string at the source. Since detectable neutrons are of primary concern, one end of the string is left at the neutron source and the other end of the string is placed at the detector. If all the possible paths that the fixed string will allow are traced, this represents all the paths that detectable neutrons will travel and a volume of investigation is defined. The volume of investigation is the volume from which the quad neutron logging tool gathers data. As such, all materials lying within that volume contribute to the recorded response.

The shape of the volume of investigation is ellipsoidal with the source and detector as the foci of the major axis. The minor axis represents the depth of investigation and is dominated by the thermalization and neutron capture properties within the volume of investigation. The length of the string is directly related to the thermalization and thermal neutron cross section capture area properties of the matrix. The thermalization properties of a matrix will be referred to as the Thermalization index and the thermal neutron cross section capture area properties as the Capture index.

From a theoretical perspective, the NN string model was defined but the quad neutron logging tool also incorporated a neutron gamma (NG) component. Research was conducted to determine the properties for the neutron gamma measurement model of the quad neutron logging tool. Originally the conclusion was that the NG model should be spherical in nature as the source of the gamma radiation originated as a result of the capture event of the neutron. Testing revealed that the gamma field is similar in shape to the neutron field that generated it and comparisons between neutron neutron and neutron gamma counts confirm this relationship. Since the measurement is truly a gamma measurement it was also known that the gamma photons can be stopped by increasing the density of the matrix it travels through. This relationship then defines an elliptical volume of investigation with the foci lengths directly proportionate to the density of the matrix.

Based on the models above the following measurements were derived.

Since both fields of investigation appeared to have the same geometrical shape, the combined measurements may be used to determine formation properties. To determine porosity, the following observation method was used.

Figure 10:
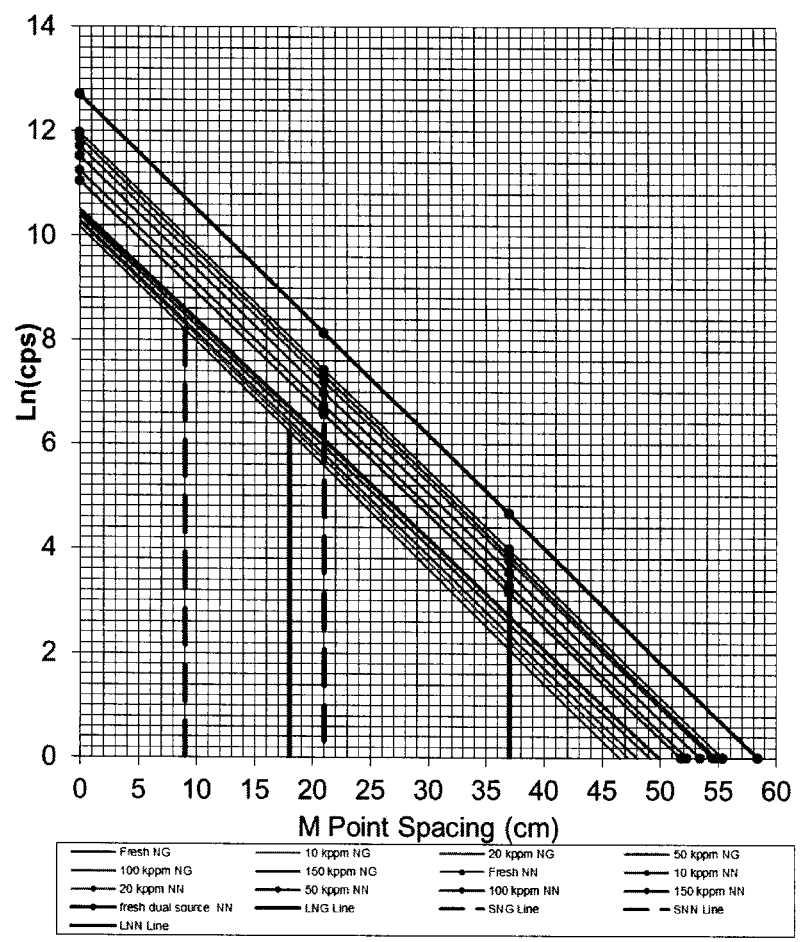
FIG. 10 is a graph showing test data illustrating the slopes of the natural log of the fields of both neutron thermal neutron and neutron gamma.

A plot of the natural log of the detector count rates is shown in FIG. 10. Borehole and liquid changes cause the NN and NG lines to shift. Porosity changes cause the lines to change slope.

The amount of slope change is related to the porosity. Slope change can be computed by Y-X or $Y-X=\ln LNG-\ln LNN-(\ln SNG-\ln SNN)$ This lead to the derivation of quad porosity (QTP).

Quad Neutron Porosity

Figure 11:
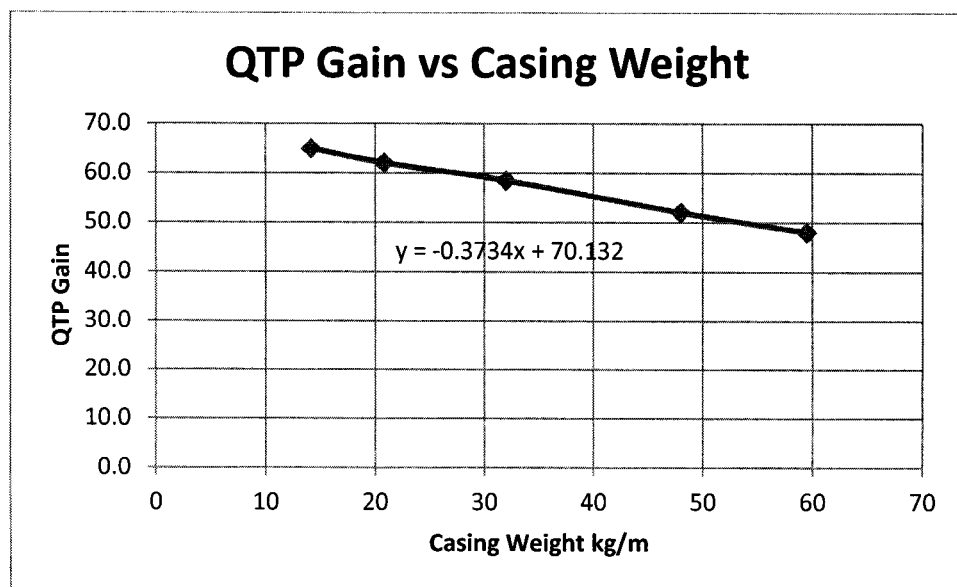
FIG. 11 is a graph illustrating the relationship on QTP gain (A) vs. various casing weights in characterizing quad neutron porosity.

One of important formation characteristic to be measured is porosity and the quad neutron logging tool allows for porosity to be characterized based on the field information collected by the quad neutron logging tool. The effect of porosity on neutron gamma and neutron thermal neutron was studied. The results showed that the porosity error for neutron gamma logging data were in the opposite direction from the porosity error for neutron thermal neutron logging data. A combining formula was created to minimize porosity error. The formula for Quad porosity (QTP) is as follows:

$$QTP = A * \ln\left(\frac{SNN * LNG}{SNG * LNN}\right) + B$$

where A and B are determined empirically and are influenced by the bit size and the amount of iron or high density material in the volume of investigation. The graph of FIG. 11 shows the relationship on QTP gain (A) vs. various casing weights.

Changing the bit size and therefore the borehole create shifts in computed porosity. The following values outlined in Table 1 were determined empirically for A values at 65 and are commonly used as a starting point for porosity. Offset porosity data should be used to properly set the shift if the current casing/bit size configuration has not been previously encountered.

TABLE 1

Empirical values for A and B based on bit size and casing diameter.

| Csg | Bit | A | B |
|---|---|---|---|
| 4½" | 6¼" | 65 | −6 |
| 5½" | 7⅞" | 65 | −9 |
| 7" | 8¾" | 65 | −12 |

Quad Neutron Clay

The presence of clay can cause errors in porosity measurement. Research in diamond drilled mining holes led to the derivation of the Quad neutron clay calculation. The derivation is based on the fact that most clays contain aluminum and that the aluminum can become radioactive when subjected to a neutron flux. The increased gamma activity can therefore be related to clay. The equation used to compute Quad Neutron Clay (QNC) in porosity units is as follows:

$$QNC = A * \left(C^{\left(\frac{SNG}{LNG}\right)} + D * \left(\frac{SNN}{LNN}\right)\right) + B$$

where A, B, C and D are empirically determined coefficients. Typical values for A, B, C and D are 0.004, 0, 1.9 & −1.5 respectively. Determination of absolute value can be determined from offset core data or local geological experience.

By absolute it is meant best fit relative to the core clay volume and core porosity. Clay volume may be measured in a laboratory to determine the physical amount of clay. The values from the core data can be plotted against the QNC curve. The parameters A, B, C and D may be adjusted until the QNC curve has a best fit relation with the core data. To do this process, B is left at 0, and then C and D are adjusted until the trend is matched and then A is adjusted such that the Core Porosity equals QTP−QNC.

Comparisons to core data confirm the accuracy of the measurement.

Quad Neutron Liquid

Figure 12:
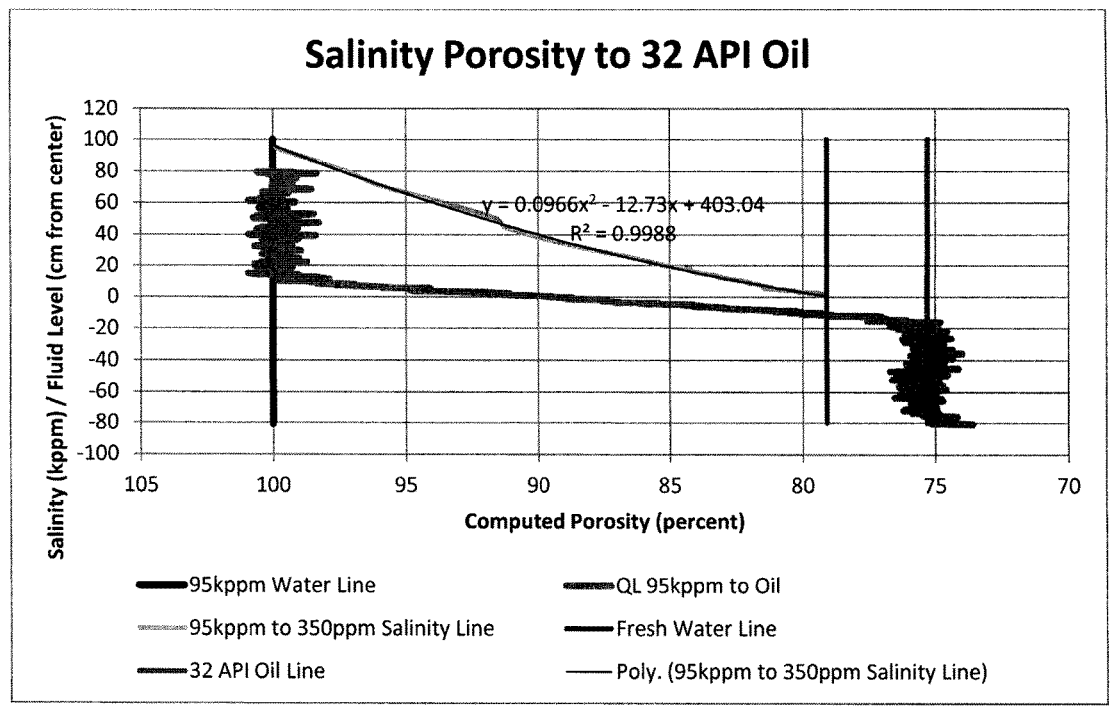
FIG. 12 is a graph showing test data illustrating the effect of varying water salinity to 32 API oil in characterizing quad neutron liquid.
Figure 13:
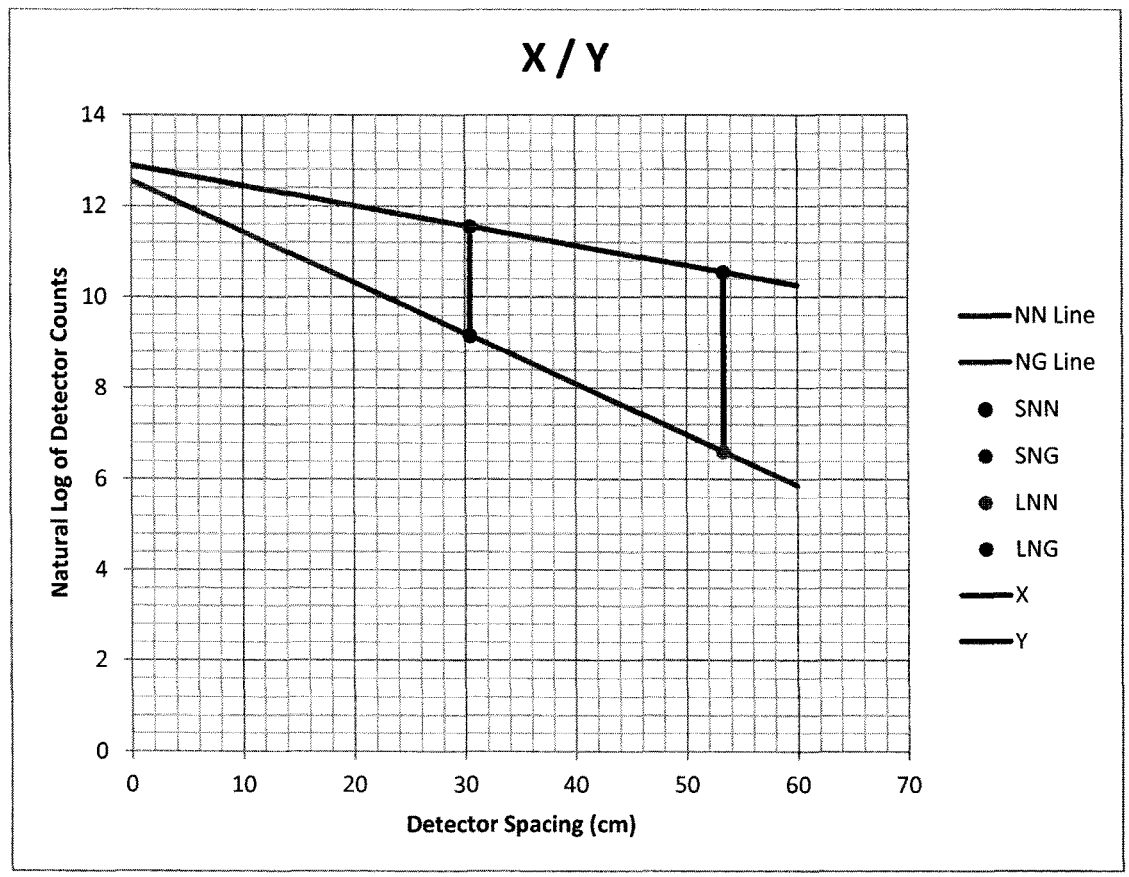
FIG. 13 is a plot showing the natural log of the detector counts against detector spacing.

One method of determining fluid types and determining saturation, relies on the determination of porosity error. In June of 1983, Roke presented a paper at the SPWLA 24th Annual Logging Symposium titled "The use of Multiple Through Casing Porosity Logs to Quantify Water Saturation". The paper is based on the concept of determining saturation based on porosity error due to liquid changes. The Quad Neutron Liquid, QNL, calculation combines the neutron thermal neutron and neutron gamma physics to maximize the porosity error. The formula is based on the observation that liquid changes cause the NN and NG lines in FIG. 13 to shift. This led to the X+Y calculation which led to the QNL calculation as follows:

$$QNL = A * \ln\left(\frac{LNG * SNG}{LNN * SNN}\right) + B$$

where A and B are chosen to create the best overlay of QNL to QTP. The effect of varying water salinity to 32 API oil are shown in the plot of FIG. 12 and are based on laboratory test data. The equation displayed in the plot of FIG. 12 can be used to determine the expected porosity value x based on a given kppm salinity y.

The Quad Neutron Liquid curve is sensitive to density changes and should be corrected before use in saturation calculations.

Dual Detector Neutron

The Dual Detector Neutron, DDN, is used to determine relative hydrogen index when overlaid with the QTP curve outlined above. The calculation is similar to the basic neutron porosity calculations used in the industry. It is presented here for completeness of the entire process. The Dual Detector Neutron is determined as follows:

$$DDN = A * \ln\left(\frac{SNN}{LNN}\right) + B$$

where A and B are chosen to create the best overlay of DDN to QTP.

Saturation

One of the objectives of formation and reservoir evaluation is to determine the Oil Saturation. Typically, the water saturation, Sw, is determined and oil is assumed as 1−Sw. Laboratory testing has shown that the saturation relationship for the quad neutron data can be approximated with a linear relationship. The Sw calculation for the Quad Neutron is determined as follows:

$$Sw = 1 - kf\frac{(QEP - QEL)}{QEP}$$

where, k represents fluid factor, f represents formation factor, QEP represents Quad Effective Porosity (Clay Free) and QEL represents Quad Effective Liquid porosity (Clay Free). QEP and QEL are determined as follows:

QEP=QTP−QC and QEL=QL−QC where, QTP represents Quad Total Porosity, QC represents Quad Clay Porosity as referred to herein as QNC and QL represents Quad Liquid Porosity also referred to herein as QNL.

The fluid factor is determined as k=1/(MaxPor*QLgain) where, MaxPor=WaterPor−OilPor and WaterPor is given as WaterPor=(12.73+$\sqrt{12.73^2-4*0.0966*(403.04-\text{Water}k\text{ppm})})/(2*0.0966)$ OilPor is given as OilPor=0.1333*oilAPI+71

QLgain is determined as

QLgain=QNL $A$ value/32.5.

The formation factor is determined through local experience in the same manner as the formation factor in Archie's equation, the industry standard Sw calculation. The Quad Liquid curve used in the above formulas should be corrected for density changes. The Quad liquid curve will measure too low porosity in high dense materials and too high porosity in low dense materials. The correction is typically done utilizing the chemical effect curve or a hybrid between the relative bulk density curve and the chemical curve.

Ancillary Measurements

Given that Quad Neutron Porosity is computed and accepted as porosity, the individual sensor readings are converted into porosity by creating a best fit relationship between the detector counts and porosity. Once this has been established, calculations can be made in porosity units between the single detectors. Of these, Relative Bulk Density, Nuclear Caliper and Chemical Effect are determined and elaborated upon.

Relative Bulk Density

One method of determining bulk density according to the prior art utilizes gamma gamma measurements that are influenced by the casing. The Quad relative bulk density measurement is based on relationships between neutron neutron and neutron gamma fields. Using observation and empirical methods, a relationship was discovered between the LNN field readings and the LNG field reading. Once both detectors have been converted into porosity, the relative bulk density is determined as follows:

Relative Bulk Density=LNNpor−LNGpor where, LNNpor and LNGpor represent the porosity converted counts.

An absolute bulk density can be determined if offset or bulk density data is available to calibrate with.

Nuclear Caliper

Another formation evaluation made capable by the Quad Neutron system and method is the ability to measure the borehole size behind pipe. The method was derived again by utilizing the Quad Neutron nuclear model, observations and empirical methods. The observation was that the LNN detector was very sensitive to near wellbore effects and therefore changes in the borehole size will influence the count rates detected. The Nuclear Caliper, NC, is determined as follows:

NC=SNNpar−LNpor where SNNpor and LNNpor represent the porosity converted counts. The raw SNN and LNN counts are converted to calibrated filtered values as will be appreciated by one skilled in the art. The calibrated filtered values are then converted to porosity by adjusting gain and shift values for each of the single detector counts until the curve has a best fit relationship with QTP over a chosen interval. The interval is chosen such that the computation of NC and CE create a may west effect in low porosity calcite intervals.

Chemical Effect

The chemical effect curve was derived to measure the chemical changes in the formation. Through observation and empirical methods, the curve was seen to be sensitive to hydrocarbon and was subsequently used to provide a correction to the Quad Neutron Liquid curve.

The Chemical Effect Curve, CE, is determined as follows:

CE=SNNpor−LNGpor where SNNpor and LNGpor represent the porosity converted single detector counts.

Flowability (Permeability)

Another measurement made possible by the quad neutron system and method is the dual gamma ray method of determining permeability. The method is based on work done on water well flowability, where it was observed that water well flow rates could be related to gamma ray levels. The basic theory is that fine highly transportable radioactive material, fines, becomes stuck in the muds of low energy depositional environments. The mud reduces permeability in the formation and therefore being able to measure the fines will allow the ability to infer permeability. The gamma energy level of these fines was thought to exist between 80 kev and 180 kev. To isolate these energies, two gamma detectors are used. A mechanical filter was designed to minimize this energy range. The filter was applied to one detector and the other detector was left unshielded. The measurements are compared to each other and as the two measurements approach, the amount of fines detected decreased which in turn infers permeability. Comparisons to open hole SP measurements has shown accurate results. Where the measurement is limited is in calcified sands as the calcification does not create a change in fines. In these instances however the quad porosity can be seen to decrease and the relative bulk density increase.

Attempts to replicate the shielding with an energy cut-off filter did not work. The reason is that the transmissivity of the mechanical filter is not a simple linear energy filter and therefore cannot be replicated with as simple energy cut-off. It has been theorized that an electrical or software filter could be made to replicate the shielding used on the filtered gamma ray but at time of writing had not been implemented. The notebooks on the design of the filters is included as part of the patent application.

Some advantages associated with the methods, systems and logging tools disclosed herein is the accurate formation evaluation carried out through-pipe. The methods, systems and logging tools of the present invention have the ability to recognize oil and gas where other technologies cannot. The other advantage is that it is safer to acquire data in horizontal wells because measurements through-pipe can be carried out which reduces the risk of losing a radioactive source in the well as a result of caving and hole sloughing. Should the hole slough or cave and the drill pipe becomes stuck, the Quad Neutron tool may be retrieved out of the pipe. Another advantage is in re-evaluating existing cased wells and identifying hydrocarbon and missed pay opportunities.

It will be appreciated that the theories outlined herein are non-limiting and it is not the inventor's intent to be bound by theory. The analysis including the comparative analysis demonstrates the accuracy and utility of the method, system and/or logging device without the need to be limited by the theory.

I claim:

1. A multi-neutron source downhole logging tool for collecting data useful in evaluating a characteristic of a formation adjacent a wellbore, the logging tool comprising:
   a multi-neutron source, each neutron source axially aligned for simultaneous emission of a neutron field into the formation;
   a short detector for detecting a neutron gamma field and a neutron thermal neutron field; and
   a long detector for detecting a neutron gamma field and a neutron thermal neutron field.

2. The logging tool of claim 1, wherein the neutron sources of the multi-neutron source are sequentially aligned end-to-end for simultaneous emission of a neutron field into the formation.

3. The logging tool of claim 1, wherein the neutron sources of the multi-neutron source are arranged to provide a preferential neutron interference field when simultaneous fields are emitted from the sources.

4. The logging tool of claim 1, wherein the short detector and the long detector are situated at an optimal distance from the multi-neutron source so that the error associated with the short detector substantially cancels the error associated with the long detector.

5. The logging tool of claim 1, wherein the multi-neutron source is a dual-neutron source.

6. The logging tool of claim 1, further comprising a housing comprising beryllium copper.

* * * * *